Patented Feb. 27, 1934

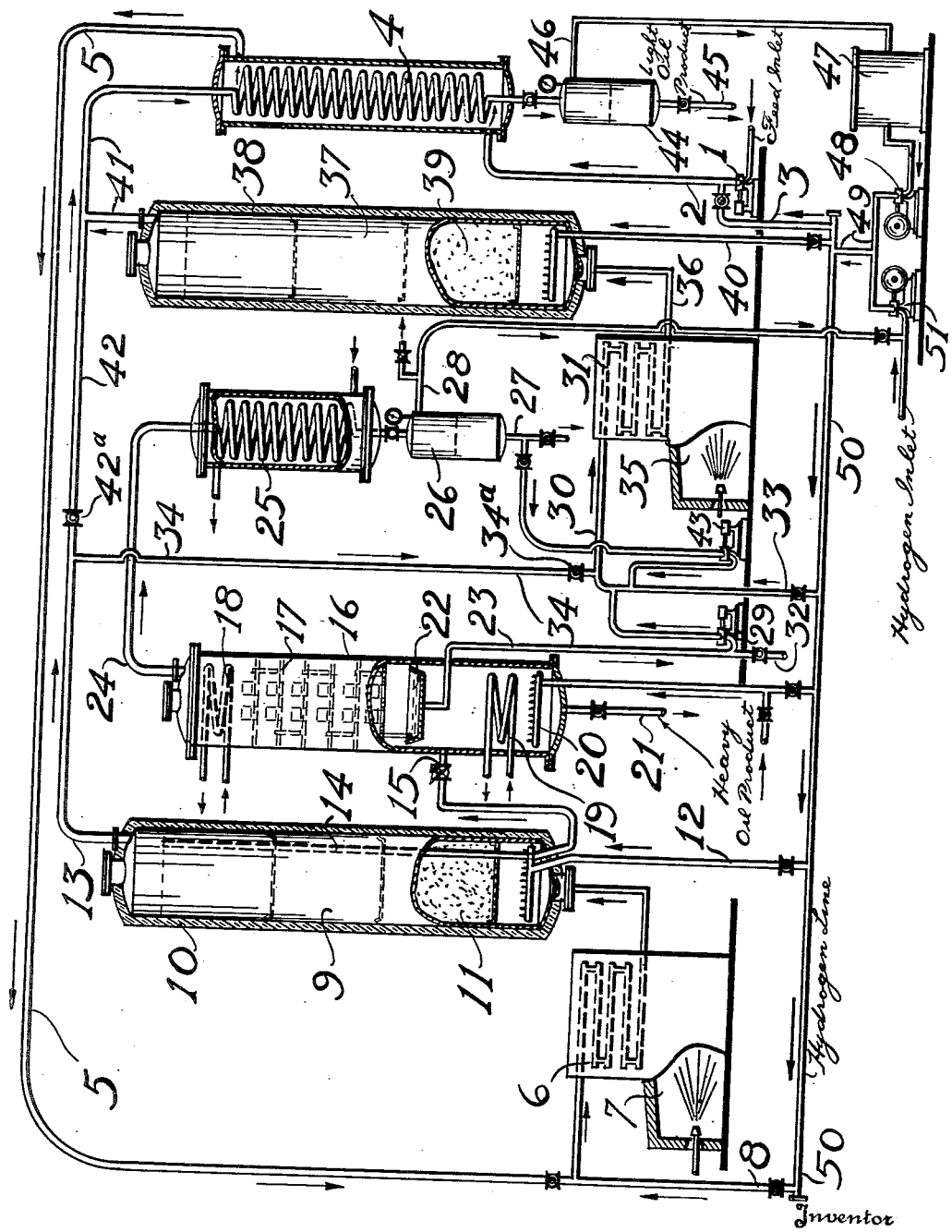

1,949,230

UNITED STATES PATENT OFFICE 1,949,230

PROCESS FOR OBTAINING VALUABLE HIGH BOILING AND LOW BOILING OILS FROM HEAVY HYDROCARBON OILS

Philip L. Young, New York, N. Y., assignor to Standard-I. G. Company

Application July 2, 1930. Serial No. 465,299

8 Claims. (Cl. 196—53)

The present invention refers to a process for improving hydrocarbon oils by the action of hydrogen under elevated temperature and pressure. The invention applies specifically to an improved process for the manufacture of high grade lubricating oils in which oils of a boiling point too low for lubricating purposes, which are formed in the process, are converted to motor fuels of excellent anti-detonating characteristics. My invention will be fully understood from the following description and drawing which illustrates one form of apparatus suitable for carrying out my invention.

The drawing shows diagrammatically in sectional elevation an apparatus constructed according to my invention and indicates the flow of the various materials in the process.

Referring to the drawing a hydrocarbon oil is fed by pump 1 from any suitable source through line 2, where it may join a stream of gas rich in hydrogen supplied by line 3, to heat exchanger 4. After flowing through 4, the oil, or gas and oil mixture, passes by line 5 to heating coil 6 mounted in a suitable furnace setting 7. Hydrogen-containing gas may be added at the coil inlet by line 8. Coil 6 discharges into reaction drum 9, which is adapted to withstand high temperature and pressure and the corrosive effect of the reactants. The drum is covered by suitable insulation 10 and is preferably packed with a catalytic material 11 supported upon trays or placed in the drum in lump form. Hydrogen or gas rich in hydrogen may be added to drum 9 by means of line 12.

Gas and low boiling oils, such as naphtha and kerosene, are vaporized and removed from the drum by line 13 while liquid is drawn off by line 14, which is preferably fitted with a pressure reduction valve 15, to separation means 16. The separation means may be an open drum which allows the escape of the lighter products from the oil owing to the release of pressure, but it is preferable to use a tower which may be provided with a baffling means 17, a reflux coil 18 at the top and a heating means 19 at the base. Hydrogen or other gas may be added as a stripping means to the bottom of tower 16 by means of spray head 20. Heavy oil, composing the lubricating fractions of the product, is withdrawn from the base of the tower by line 21, while oil of a boiling range too low for lubricants, such as kerosene, heavy naphtha, gas oil, and the like, is taken from the tower by pan 22 and line 23. A small amount of low boiling oil and gas dissolved in the oil withdrawn from the reaction drum pass from the tower by means of line 24 to cooler 25 and separator 26. The condensate, consisting of oils such as naphtha or gasoline, may be withdrawn by line 27 and the gas removed by connection 28.

The oil removed by pan 22 may be forced by pump 29 into line 30 and coil 31. If desired a portion of this oil may be drawn off by connection 32 for use in any suitable manner, such as charging to cracking coils. Connection 32 may also be used to supply suitable oil to pump 29 from an external source in order to join the stream from pan 22. Hydrogen may be added to the oil entering coil 31 by means of connection 33 and/or by line 34. Heating coil 31 is mounted in a suitable furnace 35 and discharges through line 36 into reaction drum 37 which is provided with suitable insulation 38 and designed to withstand temperatures between about 900 and 1050° F. and pressures in excess of 200 atmospheres or more.

The interior of the drum is filled with catalytic material 39 which may or may not be of the same composition as the catalyst 11 in drum 9. Additional hydrogen gas may be supplied to drum 37 by line 40. The oil passes through reaction drum 37 in the vapor state and flows out with the gas by means of line 41 to heat exchanger 4. If it is desired to avoid sending the vapors and hydrogen from drum 9 through coil 31 and drum 37, the valve 34a in line 34 may be closed and valve 42a in line 42 may be opened, whereby the gas and vapors from drum 9 pass through lines 13, 42, and 41 to heat exchanger 4. With valve 42a closed and valve 34a open, materials in line 13 will pass to coil 31 and reaction drum 37. In this case the condensate collected in separator 26 may be forced by pump 43 into line 30 to join the feed to drum 37. Operation may also be carried out where valve 34a is open while valve 42a is partially open, for example in cases where the total flow from line 13 would furnish too great an excess of hydrogen in reactor 37.

After cooling in heat exchanger 4, the gas and oil pass to separator 44 where the gas is separated from the oil, which is then withdrawn to storage through line 45. Gas passes off through line 46 to a suitable purification system 47 for removing gaseous hydrocarbons and sulfur compounds, such as scrubbing with heavy oils. The purified gas flows to booster compressor 48 which discharges into line 49 and gas manifold 50. Fresh or make-up hydrogen is supplied to line 49 by compressor 51. If desired, gas passing from separator 26 by line 28 may be added to the inlet supply of compressor 51.

In the operation of my improved process the feed stock consists of heavy hydrocarbon oils such as crudes or reduced crudes and may be stocks containing but small amounts of asphaltic materials, for example lubricating stocks.

When heavy hydrocarbon oils are hydrogenated to produce high grade lubricating oils, oil of a boiling point too low for use as lubricants is formed in the process as a side reaction product. This oil may consist of gasoline, kerosene, gas oil and the like, and may amount to 15 to 50 percent of the feed oil, depending on the severity of the hydrogen treatment. A more intensive treatment produces a larger percentage of lower boiling oils, as will be understood. Similarly, a light viscosity feed stock tends to yield more light oils, while with more viscous stocks a smaller percentage is obtained. In my improved process I propose to convert these oils which are not suitable for lubricants into high grade anti-detonating gasoline by passing them through an additional reaction stage in the presence of hydrogen. The first treatment in which the feed stock is acted upon to produce lubricants will be referred to as the primary stage, while that stage in which the light oils are converted to anti-knock fuel will be known as the secondary or destructive hydrogenation stage.

In carrying out my process the feed is heated, preferably with hydrogen, to a temperature not exceeding about 840° F. by rapid passage through a heated coil at a high rate sufficient to prevent decomposition. The heated mixture then passes under high pressure to the reaction drum of the primary stage. The drum is packed with a suitable catalyst which may comprise the oxides and/or sulfides of elements of the sixth group of the periodic table, their mixtures with each other or with other compounds, such as zinc oxide, magnesia, lime, or alumina, these being characterized by resistance to sulfur. Such catalysts may be suitably classified as sulfactive.

The primary reaction drum is preferably maintained at a temperature below about 830° F. and ordinarily between about 700 and 810° F., the heat supplied to the reactants in the coil and the heat of the reaction in the drum being sufficient to maintain the temperature of the drum, which is insulated. The pressure is held above about 20 atmospheres and preferably in excess of about 100 or 200 atmospheres, and may be as high as 1000 atmospheres, if desired. An excess of hydrogen is used with the oil, preferably in the ratio of about 5,000 to 10,000 cubic feet per barrel of oil fed to the process. The oil feed rate to the primary stage is preferably held between about 0.3 and 1.2 volumes of oil per volume of reaction drum per hour, the poorer grades of feed oil requiring more time than higher quality oil to produce similar products.

The hydrogen and oil in flowing through the catalytic mass react to form lubricating oils of high quality as regards flash, color, Conradson carbon, and sulfur, and which possess temperature-viscosity relationships tending toward those of Pennsylvania oils as distinguished from petroleums of the Texas coastal class. As mentioned above, oils too light for lubricants are formed to the extent of 15 to 50 percent of the feed. The product flowing from the primary reactor is therefore separated in such a way that the light oils may be sent to the secondary hydrogenation stage. The light fractions comprising oil boiling below 400° F., together with intermediate oils boiling above 400° F., but containing little or no lubricating oil may be treated in the secondary stage, or the intermediate oil alone may be submitted thereto.

The separation may be carried out by any suitable means, such as expansion into an open drum which allows the escape of the lighter products from oil by reason of the lower pressure, or a flash tower with bubble plates and reflux may be used. If desired this separation may take place in the presence of the hydrogen gas which passes through the primary reactor with the feed, or the gas together with a small amount of vapor may be drawn off the reactor separately, as shown in the drawing. The heavy lubricating fractions of the product from the primary reactor are withdrawn to storage from the separation means.

The light oils are passed to a heating coil where they are heated to a temperature between about 850 and 950° F. at a high rate sufficient to prevent decomposition. The heating coil discharges into the secondary reactor which is packed with a suitable catalyst which may or may not be of the same composition as that in the primary reactor. The catalyst is preferably sulfactive and may comprise the oxides and/or sulfides of elements of the sixth group of the periodic table, their mixtures with each other or with other compounds, such as zinc oxide, magnesia, lime or alumina.

Hydrogen gas may pass through the coil with the oil, or it may be introduced separately into the secondary reactor in a heated or unheated condition. The hydrogen may consist of that employed in the primary stage, or fresh hydrogen or both, may be used. Contrary to the primary stage, where a large excess of hydrogen is employed, only sufficient hydrogen is used in the secondary reactor to prevent the formation of coke or asphaltic materials. If too great an excess of hydrogen is used, the knock-suppressing qualities of the product are lessened. It is preferable, therefore, to employ hydrogen in an amount equivalent to about 1000 to 4000 cubic feet per barrel of oil fed to the secondary reactor, or less may be employed. The pressure may be the same as that in the primary stage, or may be higher or lower, but is ordinarily in excess of 20 atmospheres and preferably about 100 to 200 atmospheres.

The secondary reactor is carried at a temperature above 900° F. and preferably in the range between about 930 and 1050° F. Owing to the evolution of heat by reaction of the hydrogen and oil in the presence of the catalyst it is usually possible to operate with a coil outlet temperature 50 to 100° F. lower than the desired reactor temperature, thus depending on the heat of reaction to raise the reactants to the desired temperature and maintain them at that point in the reactor, which is suitably insulated. The feed rate to the secondary reactor is dependent on the degree of improvement desired in the product and is lower for greater improvement, as will be understood. In general, the feed rate may be taken between 1.5 and 4.0 volumes of oil per volume of reactor per hour.

By reason of this additional stage of treatment for the light oils, it is possible to convert them to gasoline of high anti-detonating qualities. The gasoline so obtained is also superior from the standpoint of low sulfur, excellent color, and small content of resinous or gum forming materials. If the light oils are not totally converted to gasoline on one passage through the reactor, the unconverted fractions may be re-passed one or more times through the reaction zone and thereby transformed to gasoline. By this means 70 to 85 percent of the light oil fed to the secondary reactor may be converted to anti-detonating gasoline.

My invention is not to be limited by any theory of the mechanism of the reactions nor to any specific example which may have been given for purpose of illustration, but only by the following claims in which I wish to claim all novelty inherent in this invention.

I claim:

1. An improved process for obtaining valuable products from heavy hydrocarbon oils comprising passing the oil in liquid condition with free hydrogen under pressure in excess of 20 atmospheres through a reaction zone containing a sulfactive catalyst with conditions of feed rate, high partial pressure of hydrogen and temperature suitably interadjusted to materially increase by destructive hydrogenation the lubricating quality of the heavier fractions, with a limited formation of lower boiling fractions, withdrawing liquid oil, separating such lower boiling fractions unsuitable for lubricants therefrom, and passing such lower boiling fractions at a relatively higher temperature with free hydrogen under pressure in excess of 20 atmospheres but with reduced hydrogen partial pressure over a second sulfactive catalyst to produce by destructive hydrogenation a light low boiling product of marked antidetonating properties suitable for motor fuel.

2. Process according to claim 1 in which the first hydrogenation step is accomplished at a temperature below about 830° F. and the second hydrogenation step is at a temperature above 900° F.

3. An improved process for obtaining high grade lubricating oil and motor fuel from heavy hydrocarbon oil comprising the steps of first hydrogenating the oil in liquid phase in the presence of a sulfactive catalyst at a destructive hydrogenation temperature below 830° F. a total pressure of the order of 200 atmospheres, a relatively high partial pressure of hydrogen and feed rate permitting only limited formation of naphtha whereby the lubricating quality of the heavier fractions is increased with a concurrent production of lighter oils unsuitable for lubricants, withdrawing the oil in liquid condition, separating these lighter oils unsuitable for lubricants therefrom and destructively hydrogenating such lighter oils over a sulfactive catalyst at a temperature above 930° F. at a pressure above 20 atmospheres and at a relatively lower partial pressure of hydrogen to produce a product rich in fractions boiling below 400° F. of highly antidetonating value.

4. Process according to claim 3 in which a second hydrogenation step is carried out at a pressure not in excess of that used in the first hydrogenation step and in which a sufficient part of the gases leaving the first step is passed with the lighter oils unsuitable for lubricants through the second destructive hydrogenation step to provide a relatively smaller amount of hydrogen sufficient to prevent formation of tarry bodies in the destructive hydrogenation step.

5. Process according to claim 3 in which the first hydrogenation step is accomplished at temperature between about 700° and 830° F. and the second step at temperature between about 930° and 1050° F.

6. Process according to claim 3 in which the product from the first hydrogenation step is separated into light oils boiling below 400° F., a heavy fraction containing substantially all the lubricating oil, and an intermediately boiling fraction, and submitting the intermediate fraction to the second stage of hydrogenation.

7. Process according to claim 3 in which material fed to the first hydrogenation step is a heavy petroleum lubricating distillate and the rate of flow is adjusted whereby from 15 to 50% of an oil too light for lubricating purposes is produced in the first stage.

8. Process according to claim 3 in which the first hydrogenation stage is accomplished under the influence of strongly hydrogenating catalysts.

PHILIP L. YOUNG.